UNITED STATES PATENT OFFICE.

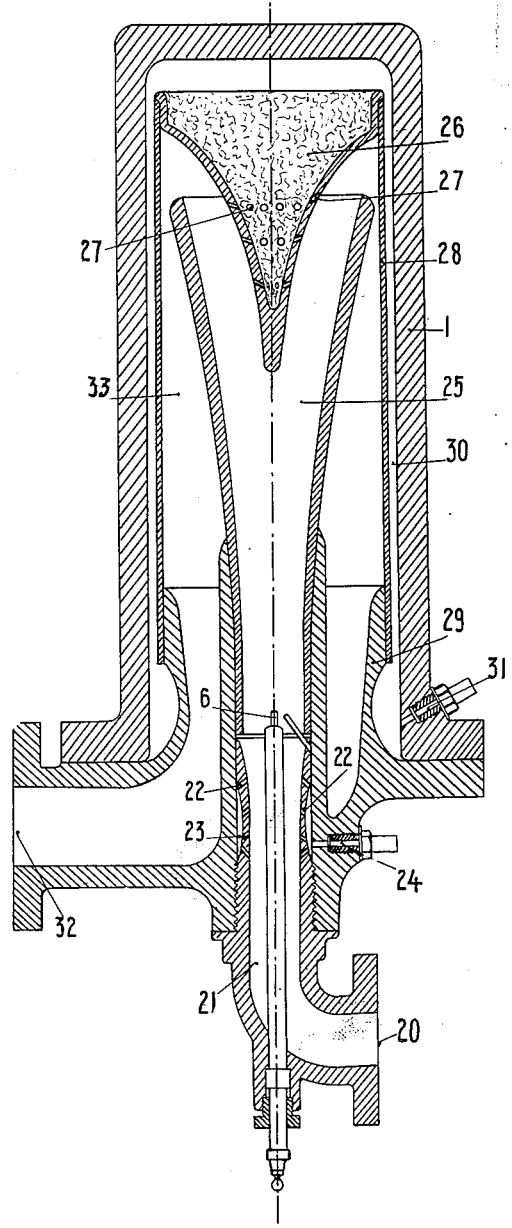

FRANCESCO MILLER, OF TURIN, ITALY.

PRODUCTION OF FLUID FOR POWER.

No. 864,017.  Specification of Letters Patent.  Patented Aug. 20, 1907.

Application filed December 22, 1906. Serial No. 349,201.

*To all whom it may concern:*

Be it known that I, FRANCESCO MILLER, of Turin, Via S. Anselmo 1, Italy, have invented certain new and useful Improvements in the Production of Fluid for Power, of which the following is a full, clear, and exact specification.

The object of the present invention is the production of a fluid under pressure for use in power machines such as motors, turbine and the like.

According to the present invention liquid fuel, such as for instance benzin, is mixed with air and led to burn into a receptacle wherein water comes in close contact with the burning mixture whereby it is vaporized, so that a fluid under pressure, composed of vaporized water, and the gases generated by the combustion of the fuel with air, is produced which can be utilized for working power machines as before said.

The figure of the drawing is a longitudinal section of the improvement.

Referring to the drawing the air is fed through opening 20 to pipe 21 communicating through holes 22 with an annular space 23 wherein fuel is admitted from its outside through pipe 24. The fuel passing from space 23 to the upper portion of pipe 21 gets mixed with the air contained therein, and its ignition is started by an electric candle 6. Pipe 21 leads upwardly to an enlarged chamber 25 open at the top and containing in its upper portion a correspondingly shaped receptacle 26 having holes 27. The receptacle 26 contains divided metal such as wire gauze, balls, chips and the like, and is carried by a cylindrical casing 28 fixed to a projecting portion 29 in the lower portion of receptacle 1, so as to leave a narrow annular space 30 between the outer surface of casing 28 and the inner surface of receptacle 1. Water is fed to space 30 through an inlet 31 and rises into said space reaching, partly vaporized, the top of receptacle 26 where it comes in contact with the divided metal and the burning gases and becomes vaporized and heated to a high degree of temperature and pressure. The mixture of combustion gases and steam passes to the space 33 between the walls of chamber 25 and casing 28, until it reaches the exit 32 whereupon it can be led to any desired machine or apparatus for its employment. The annular space 30 is filled with fresh water so that the loss of caloric to the outside is greatly diminished. It has also the advantage that the burning gases and the water are brought into contact with each other while traveling in opposite directions, so that they are quickly and thoroughly mixed.

The action of the electric candles is generally limited to the period of starting the apparatus, the burning of the mixture keeping on afterwards in a continuous manner.

The working of the apparatus is of course to be carried on with the aid of compressing machines, such as pumps or the like, for introducing the fuel and the air into the chamber of combustion.

What I claim is:

1. An apparatus for the production of a compressed fluid for power purposes, comprising a casing, a combustion chamber in the casing and having an open upper end terminating short of the upper end of the casing, means for admitting a hydrocarbon mixed with air to the lower end of said chamber, a perforated chamber in the upper part of the casing and adapted to contain a mass of metal, and means for delivering water to the chamber containing the metal.

2. An apparatus for the production of a compressed fluid for power purposes, comprising a casing, a combustion chamber within the casing and having an open upper end, means for admitting a hydrocarbon mixed with air to said chamber, a receptacle projecting into the top of the combustion chamber and adapted to contain a mass of divided metal, and means for admitting water to said receptacle.

3. An apparatus for the production of a compressed fluid for power purposes, comprising a casing, a combustion chamber within the casing and having a flaring upper open end, means for admitting a hydrocarbon mixed with air to the combustion chamber, a conical receptacle projecting into the open end of the combustion chamber and adapted to contain a mass of divided metal, and means for admitting water to said receptacle.

4. An apparatus for the production of a compressed fluid for power purposes comprising a casing, a combustion chamber within the casing and having a flaring open upper end, means for admitting a hydrocarbon mixed with air to the combustion chamber, a second casing within the first, spaced therefrom and terminating short of its ends, a receptacle carried by the second casing and projecting into the open end of the combustion chamber, said receptacle being adapted to contain a mass of divided metal, and means for admitting water within the space between the said casings.

5. An apparatus for the production of compressed fluid for power purposes comprising a casing, an air pipe projecting into the casing, a combustion chamber with which the air pipe communicates, a chamber surrounding the air pipe and communicating therewith, means for admitting hydrocarbon into the chamber, a second casing within the first casing spaced therefrom and terminating short of its ends, a receptacle carried by the second casing and projecting into the combustion chamber, said receptacle being adapted to contain a mass of divided metal, and means for admitting water to the lower portion of the space between the said casings.

In witness whereof, I have hereunto signed my name in the presence of two subscribing witnesses.

FRANCESCO MILLER.

Witnesses:
TEOBALDO BARBERIS,
CARLO MARTINI.